United States Patent [19]

Thorsheim et al.

[11] Patent Number: 4,537,576
[45] Date of Patent: Aug. 27, 1985

[54] EDUCATIONAL BOOK WITH INTERACTIVE ELEMENTS

[76] Inventors: Howard I. Thorsheim, 314 Oxford St.; Bruce B. Roberts, 415 Ivanhoe Ave. West, both of Northfield, Minn. 55057

[21] Appl. No.: 631,162

[22] Filed: Jul. 16, 1984

[51] Int. Cl.³ .............................................. G09B 1/22
[52] U.S. Cl. .................. 434/404; 281/15 R; 283/63 R; 446/147
[58] Field of Search ............... 434/433, 174, 198, 404; 281/15 R, 29; 283/56, 63 R, 64; 446/147–152; 273/141 R, 142 H, 142 HA

[56] References Cited

U.S. PATENT DOCUMENTS

| 730,859 | 4/1903 | Austin | 434/150 X |
|---|---|---|---|
| 1,028,921 | 6/1912 | Wagner | 283/63 R |
| 1,551,660 | 9/1925 | Gove | 283/56 |
| 1,578,895 | 3/1926 | Joyce | 434/430 X |
| 1,617,657 | 2/1927 | Studebaker | 434/347 |
| 2,370,229 | 2/1945 | Buckley | 273/142 HA |
| 2,689,751 | 9/1954 | Baller | 283/63 |
| 2,902,775 | 9/1959 | Arrowsmith et al. | 273/141 R X |
| 2,917,325 | 12/1959 | Sines | 273/141 R X |
| 3,191,319 | 6/1965 | Waisgerber | 434/299 |
| 3,605,287 | 9/1971 | Jonesi | 434/85 |
| 3,753,581 | 8/1973 | Kamstra | 283/56 |
| 3,874,095 | 4/1975 | Dewaele | 434/198 |
| 3,918,180 | 11/1975 | Chamberlin | 434/178 |
| 4,249,757 | 2/1981 | Gella | 281/15 |

FOREIGN PATENT DOCUMENTS 540965 3/1956 Italy ................................ 434/174

*Primary Examiner*—William H. Grieb
*Attorney, Agent, or Firm*—Kinney & Lange

[57] ABSTRACT

An educational book providing interaction between graphic information contained on reference elements rotatably attached to a base leaf and a second set of graphic information contained on apertured leaves. The apertured leaves superimpose the base leaf and reference elements, such that the apertures are visually aligned with the reference elements. The second set of graphic information areas are juxtaposed with respect to the apertures of the leaves to combined with the graphic information of the reference elements visible through said apertures. To maintain this alignment, the apertured leaves and base leaf are rotatably bound together at one end by a binding mechanism.

15 Claims, 10 Drawing Figures

EDUCATIONAL BOOK WITH INTERACTIVE ELEMENTS

BACKGROUND OF THE INVENTION

1. Field of the Invention

The present invention relates generally to an educational book whose leaves have apertures allowing interaction between one graphic information set contained on rotatable elements attached to a reference page and a second graphic information set contained on the apertured pages.

2. Description of the Prior Art

Various types of books have used apertured pages which allow interaction between information contained on the apertured pages and information contained on a reference page. Many of these books have informationally incomplete apertured leaves which refer to and have in common an object or primary graphic information. The object or graphic information are visually aligned with the leaf apertures and merely supplement or complete the information contained on the leaves. One example of these "complete the page" books is disclosed in U.S. Pat. No. 2,689,751 to Baller. The Baller device, through cutouts or apertures on the pages, allows an object or figure to appear in a different environment or setting. The object is aligned with and threaded through the apertures in such a manner that as the pages are turned, the object is pulled through the aperture of the turned page into alignment with the aperture of the following page.

Another example of a "complete the page" book is U.S. Pat. No. 1,028,921 to Wagner which discloses a picture book having on its apertured leaf incomplete pictures or designs. These pictures are completed by a design in relief on the cover of the book visible through the apertures of the leaves.

A further example is U.S. Pat. No. 1,551,660 to Gove which discloses multiple sheet stationery in which the address data appears on a statement and is visible through an apertured cover letter sheet superimposed on the bill.

Still another example in U.S. Pat. No. 4,249,757 to Gella which discloses, in one embodiment, a book with components of graphical information fixed to the rear surface of the first page and to the front surface of the last page and having apertured pages therebetween. The apertures are aligned with the components of graphical information on the first and last page to convey to the reader a graphical message combining information on the first and last page with the information on the apertured leaves aligned therewith.

Other books have disclosed an arrangment by which information is successively and cumulatively exposed to view through leaf apertures as the reader progresses through the apertured leaves of the book. U.S. Pat. No. 3,191,319 to Waisgerber discloses such a book in which discrete specimens are successively and cumulatively exposed to view. U.S. Pat. No. 3,753,581 to Kamstra and a second embodiment of Gella aforementioned further discloses such a book in which graphic information is continually or progressively made visible through the apertures of the leaves for interaction with information contained on the leaves and juxtaposed with respect to the aperture. On all three patents, the graphic information viewed through the leaf apertures may not be varied relative to nor controlled by information contained on the leaf apertures.

U.S. Pat. No. 3,605,287 to Jonesi discloses a system using apertures to form the outline of a character or figure. A guide member is provided with small openings arranged to form the outline of a figure and is superimposed over a marking surface so that a series of dots forming the outline of the character can be impressed on the marking surface through the openings. With this system, information contained on the guide is passed on and not supplemented by information visually aligned with the apertures.

U.S. Pat. No. 730,859 to Austin utilizes a series of superimposed apertured leaves to expose different portions of a reference object through said apertures. U.S. Pat. No. 1,578,895 to Joyce utilizes a series of superimposed apertured leaves to give a unified view of the whole or assembled reference object. On both patents, the outline of the object of interest may not be varied but only progressively disclosed or assembled by successive superimposition of the other apertured leaves in the book.

None of the above prior art references disclose a booklet utilizing apertured leaves which allow interaction between information contained on the apertured leaves and information contained on a reference leaf or leaves in which the information contained on the reference leaf or leaves may be varied in accordance with instructions contained on the apertured leaves.

SUMMARY OF THE INVENTION

It is the general object of the present invention to disclose a new type of educational booklet utilizing apertured leaves to allow interaction between information contained on a reference page with information contained on the apertured leaves. In the present invention, the information contained on the reference page may be varied in accordance with instructions contained on the apertured leaves.

In a preferred embodiment, the educational book of the present invention comprises a plurality of varying sized reference elements containing a first set of graphic information areas. These reference elements are successively superimposed on each other and a base leaf, each reference element being smaller than the reference element behind it. The reference elements are further arranged for rotation relative to each other and the base leaf about a common axis of rotation.

The book further comprises groups of apertured leaves having at least one leaf per group, with each group of leaves defining an aperture corresponding to one of the reference elements. A second set of graphic information is contained on the leaves juxtaposed with respect to the aperture. The leaf groups are superimposed over the base leaf such that the leaf groups define progressively larger apertures as the pages are moved sequentially, cumulatively exposing an additional reference element to view. Instructions contained on the apertured leaves allows interaction between the secondary set of graphic information contained on the apertured leaves and the first set of graphic information contained on the exposed reference elements in a variable but controlled manner.

In order to retain the base leaf and apertured leaves in alignment, a binding means is used to hold the base leaf and apertured leaves together at one end. A front and rear cover may further be used to protect the apertured leaves and base leaf from the environment.

DETAILED DESCRIPTION OF THE PREFERRED EMBODIMENTS

Figure 1:
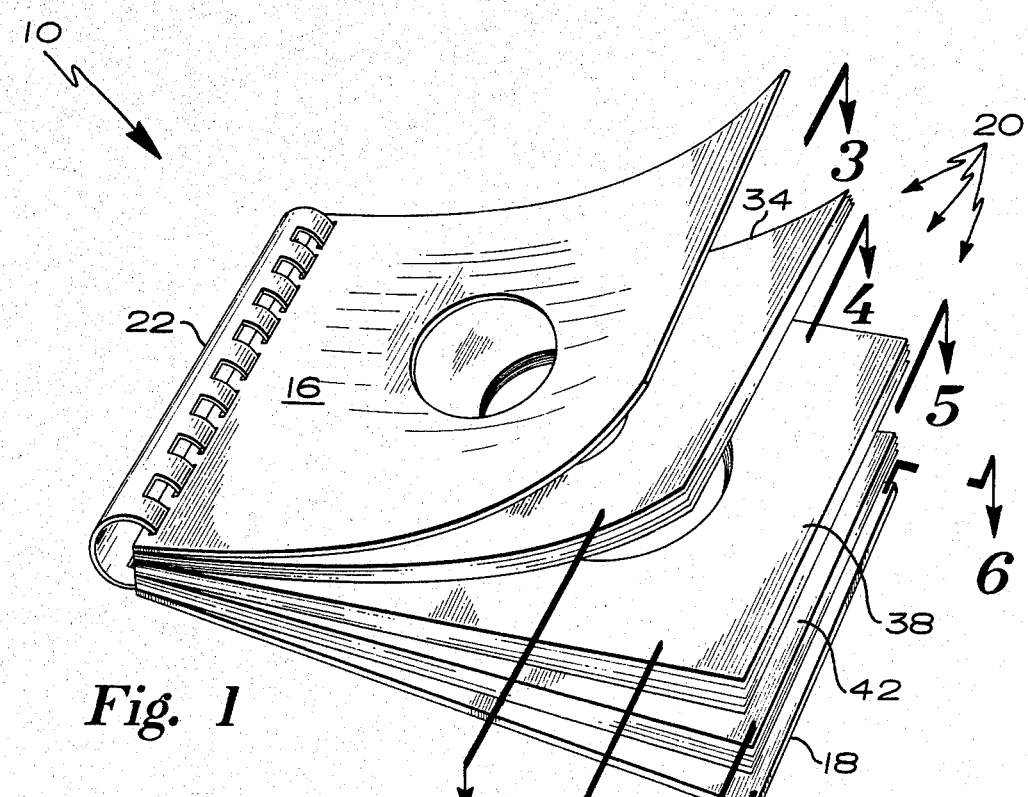
FIG. 1 is a perspective view of a book in accordance with the present invention.

A preferred embodiment of the educational book of the present invention is generally shown at 10 in FIG. 1. At least one and preferably a plurality of reference elements containing a first set of graphic information is rotatably mounted to and carried by a base leaf 18 as more fully described below. A plurality of apertured leaf groups 20 contain a second set of graphic information on a face 16 juxtaposed with respect to the apertures with the leaf apertures visually aligned with the reference elements. This second set of graphic information at 16 may contain instructions directing the rotation of the reference elements relative to each other and to the groups of apertured leaves 20. Because of the variability of the graphic information presented to the reader by the rotation of the reference elements, a much greater scope of information may be presented on one apertured leaf than has been presented before by other educational books.

To keep the apertured leaf groups 20 in alignment with the base leaf 18, a binding mechanism 22 binds the apertured leaves of each group and the base leaf 18 together at one end. Binding mechanism 22 is arranged so that the apertured leaves of each group may be rotated about the binding mechanism 22. Binding mechanism 22 may also be arranged so that leaves may be substituted, removed from, or added to the book 10. The book 10 may further comprise a front cover and/or back cover, the front cover also defining an aperture, if desired.

Figure 6:
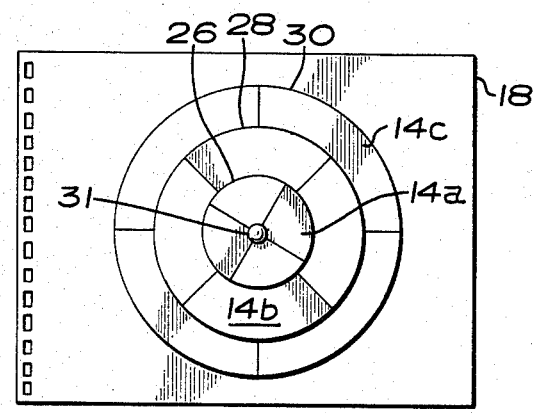
FIG. 6 is a sectional view of the book taken along the line 6—6 of FIG. 1, showing the base leaf and reference elements rotatably attached thereto.

In one preferred embodiment, as shown in FIG. 6, disk shaped reference elements 26, 28 and 30 of varying size are rotatably mounted with respect to base leaf 18 along a common axis by pin 31. These disks successively overlie each other and base leaf 18, with each disk being smaller than the disk behind it.

For each disk there is preferably a coordinating leaf group containing at least one apertured leaf. The leaf or leaves in the coordinating group define an aperture preferably corresponding in size and configuration to said disk. These groups of apertured leaves overlie base leaf 18 such that the apertured leaves appear with progressively larger apertures as the reader sequentially moves the leaves. This progressively and cumulatively exposes the reference elements as the reader sequentially moves the leaves.

Figure 2:
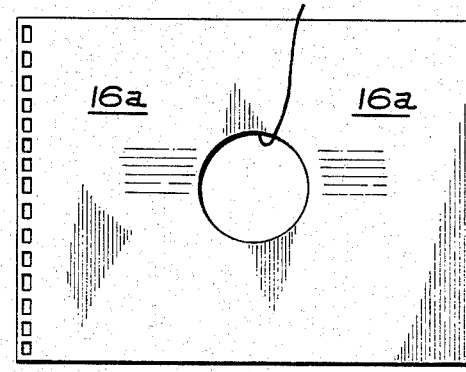
FIG. 2 is a top view of the first apertured leaf of the book of FIG. 1.
Figure 3:
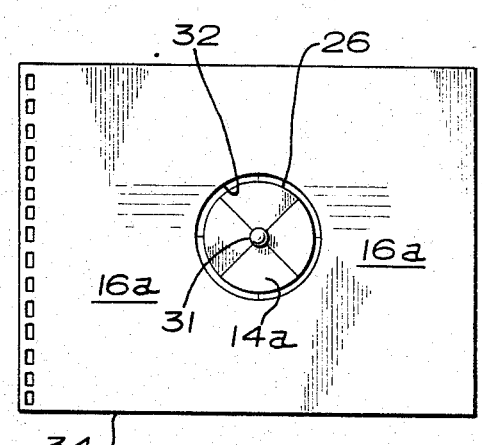
FIG. 3 is a sectional view of the book taken along the line 3—3 of FIG. 1, showing the aperture of the first leaf visually aligned with the first reference element.
Figure 4:
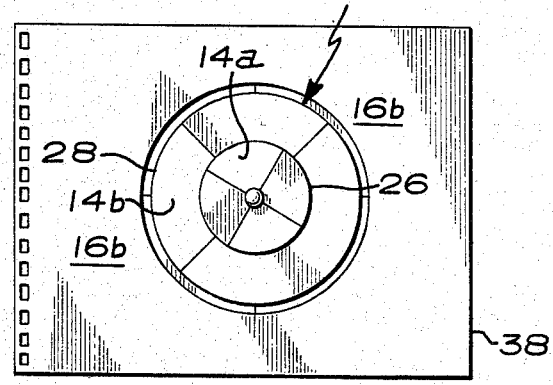
FIG. 4 is a sectional view of the book taken along the line 4—4 of FIG. 1 showing the larger aperture defined by a second group of leaves visually aligned with the first and second reference elements.
Figure 5:
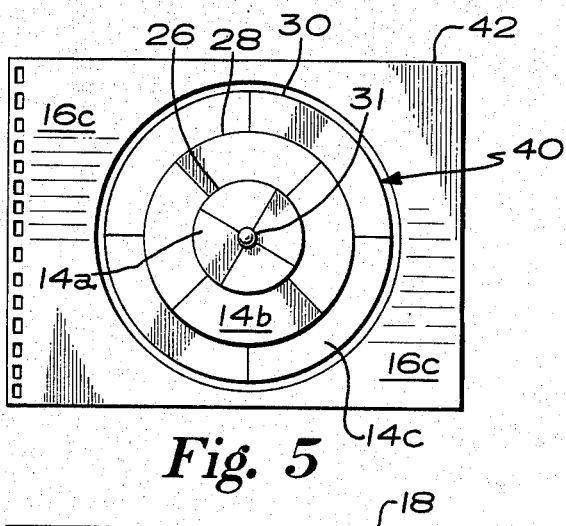
FIG. 5 is a sectional view of the book taken along the line 5—5 of FIG. 1, showing the aperture defined by a third group of leaves visually aligned with the first, second and third reference elements.

FIGS. 2, 3, 4 and FIG. 5 illustrate three leaves defining varying sized apertures, specifically aperture 32 and leaf 34 of FIGS. 2 and 3, aperture 36 and leaf 38 in FIG. 4, and aperture 40 and leaf 42 in FIG. 5 all intended for cooperation with the base leaf 18 and discs 26, 28 and 30 of FIG. 6. Leaves 42, 38 and 34 overlie base leaf 18, in that order, and only reference disk 26 is visible through the aperture 32 on top leaf 34 shown in FIG. 3. As the reader moves the leaves sequentially and encounters a leaf defining a larger aperature, such as leaf 38, reference disk 26 and 28 become cumulatively exposed as shown in FIG. 4. When the leaves are further sequentially moved to encounter leaf 42 defining an even larger aperture 40, reference disks 26, 28 and 30 become cumulatively exposed as shown in FIG. 5.

When leaves 42, 38 and 34 overlie base leaf 18 as shown in FIG. 3, information at 16a contained on the leaf 34 is free to interact with information contained on the referenced disk 26, as indicated by information area 14a. As the reader sequentially moves the leaves to further expose the reference element 28, the reader is able to combine information contained on leaf 38, as indicated at 16b, with information contained on both reference disks 26 and 28, as indicated by information areas 14a and 14b in FIG. 4. Finally, as the reader sequentially moves the leaves to further expose reference element 30, the reader is able to combine information 16c of leaf 42 with the information contained on any or all three reference disks 26, 28 and 30 as shown by information areas 14a, 14b and 14c in FIG. 5. Because disks 26, 28 and 30 are rotatable relative to each other and the leaves 34, 38 and 42, the reader may combine information from various information areas on each of the disks with the information contained on each apertured leave.

Figure 7:
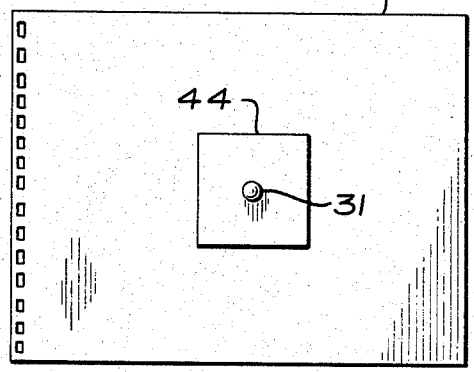
FIG. 7 is an alternative embodiment of a reference element attached to the base leaf taken along the line 6—6 of FIG. 1.
Figure 8:
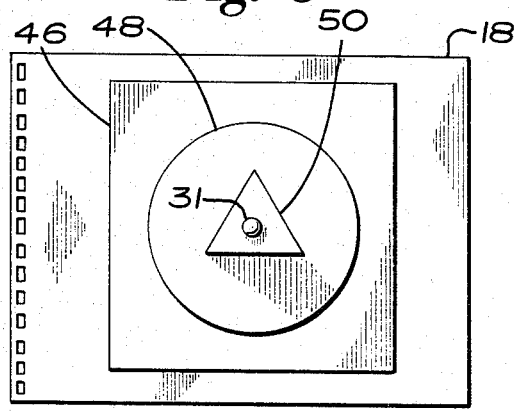
FIG. 8 is an alternative embodiment of the book base leaf taken along the line 6—6 of FIG. 1.

The educational book of the present invention is by no means limited to disk-shaped reference elements. As an example of another preferred embodiment, FIG. 7 shows base leaf 18 defining a square shaped reference element 44 rotatably mounted to base leaf 18 by pin 31. Further, reference elements of various sizes and configurations may be used, as disclosed in yet another preferred embodiment illustrated in FIG. 8. Base leaf 18 carries a square reference element 46, circular reference element 48 and a triangular reference element 50, in that order. All three reference elements are rotatably mounted along a common axis to base leaf 18 by pin 31. The various configurations of these disks allows individuals having difficulty distinguishing between multiple rotating disks to more readily identify information on the various reference elements. It may also act as a teaching aid to identify various configurations in order to appropriately combine information on the aperture leaves with the desired information on the reference elements.

Figure 9:
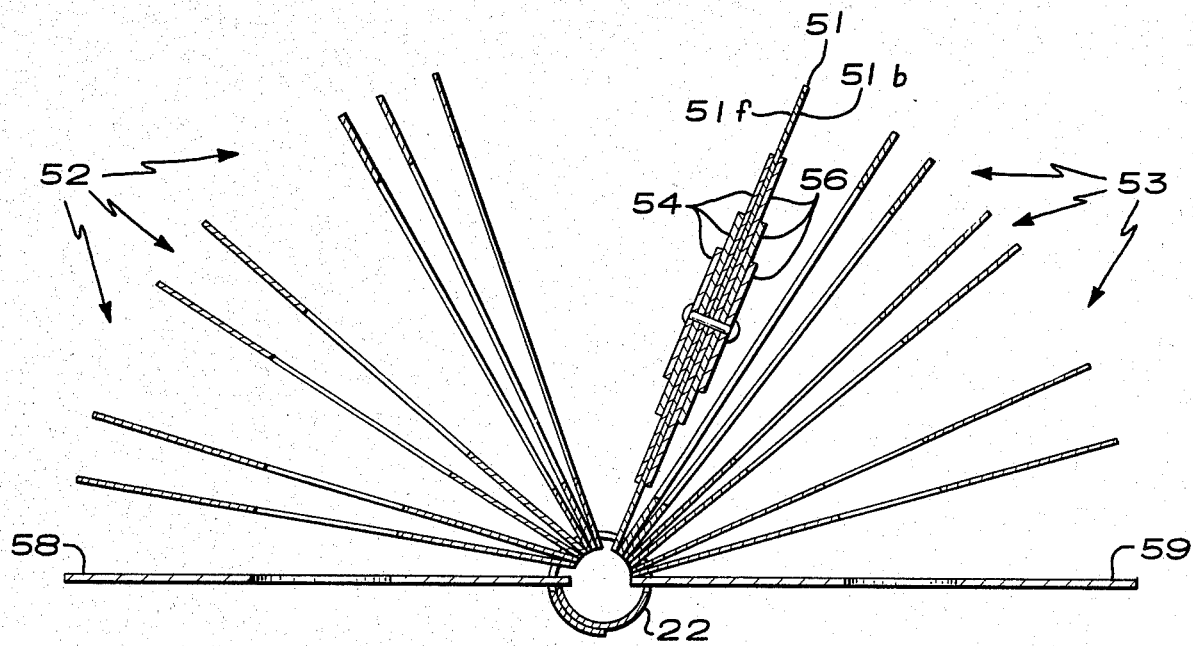
FIG. 9 is an end view of an alternative embodiment taken along a line passing through the center of the book which extends from the bound end of the book and passes through the leaf apertures to the opposing free end of the book, disclosing a base leaf interposed between the apertured leaves and having reference elements rotatably attached on both its sides.

FIG. 9 discloses yet another embodiment of the present invention. Base leaf 51 having a front side 51f and a back side 51b, is interposed between a first plurality of apertured leaf groups 52 and a second plurality of apertured leaf groups 53. A first set of reference elements 54 of varying size are rotatably mounted to the front side 51f of base leaf 51 along a common axis as shown by pin 55. The reference elements in set 54 are mounted such that each reference element is smaller than the reference element behind it. Base leaf 51 further comprises a second set of reference elements 56 of varying size rotatably mounted to the back side 51b of base leaf 51 along a common axis, which may be an extension of the axis of the first plurality of reference elements 54 as shown by pin 55. The reference elements in set 56 are also mounted such that each reference element is smaller than the reference element behind it when viewing base leaf 51 from the back side 51b. The book also has an apertured front cover 58 and an apertured back cover 59.

The first plurality of apertured leaf groups 52 preferably comprise, for each reference element in set 54, a leaf group including at least one leaf, all leaves within the group defining an aperture similar in size and configuration to that reference element. The apertured leaf groups are further superimposed over the front side 51f of base leaf 51 such that progressively larger apertures are exposed as the reader sequentially moves the leaves in a normal manner.

The second plurality of apertured leaf groups 53 preferably comprise, for each reference element in set 56, a leaf group including at least one leaf, all leaves within the group defining an aperture similar in size and configuration to that reference element. Leaves 53 lie beneath base leaf 51 such that progressively smaller apertures are exposed as the reader sequentially moves the leaves in a normal manner.

The arrangement disclosed in FIG. 9 allows the reader to combine graphic information contained on the first plurality of apertured leaf groups 52 with graphic information contained on the reference elements in set 54 by using the book in a normal manner. The arrangement also allows the reader to combine graphic information on the second plurality of apertured leaf groups 53 with graphic information contained on reference elements in set 56 by flipping the book over and using it in a normal manner or by reversing the sequence by which the pages are normally moved so that the book reads from right to left.

Figure 10:
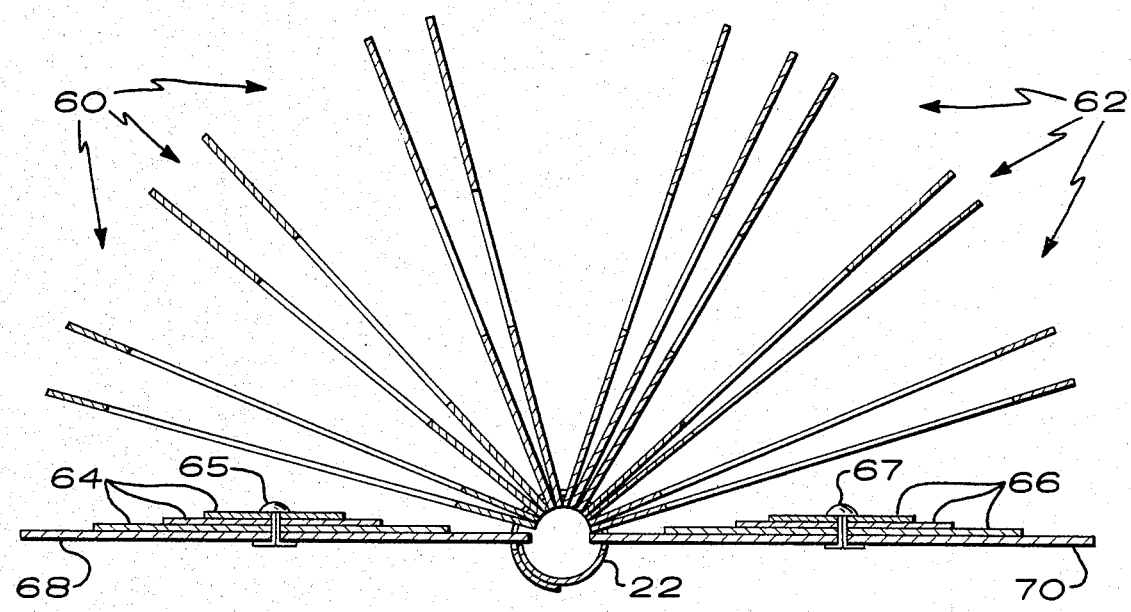
FIG. 10 is a view similar to FIG. 9 showing reference elements rotatably attached to the inside of the front cover and the inside of the back cover of the book, with apertured leaves therebetween.

FIG. 10 discloses still another preferred embodiment of the present invention. As can be seen, reference elements in set 64 are of varying size and are rotatably mounted along a common axis by pin 65 to the inside of front cover 68, such that each reference element is smaller than the reference element behind it. Reference elements in set 66, of varying size, are rotatably mounted along a common axis by pin 67 to the inside of back cover 70 such that each reference element in set 66 is smaller than the reference element behind it. A first plurality of apertured leaf groups 60, disposed adjacent front cover 68, comprise, for each reference element in set 64, a leaf group having at least one leaf, all the leaves in the group defining an aperture similar in size and configuration to that reference element. Leaf groups 60 are arranged such that progressively smaller apertures are exposed as the reader sequentially moves the leaf groupings in a normal manner. A second plurality of apertured leaf groups 62, disposed adjacent back cover 70, comprise for each reference element in set 66, a leaf group having at least one leaf, all the leaves within the group defining an aperture similar in size and configuration to that reference element. Said leaf groups 62 are arranged such that progressively larger apertures are exposed as the reader sequentially moves the leaf groupings in a normal manner.

The arrangement of FIG. 10 allows interaction between graphic information contained on reference elements in set 64 and graphic information contained on leaf groups 60 simultaneously with interaction between graphic information contained on reference elements in set 66 and graphic information contained on leaf groups 62. The first plurality of leaf groups 60 and the second plurality of leaf groups 62 of FIG. 10 could be replaced by leaves defining an aperture of similar size and configuration with the largest reference element contained on either front cover 68 or back cover 70. This would also allow simultaneous interaction between information contained on all of the reference elements in sets 64 and 66 and information contained on the apertured leaf groups 60 and 62, as the reference elements in sets 64 and 66 would be visible at all times as the leaves are moved sequentially.

It will also be apparent to those skilled in the art that a number of other modifications and changes can be made without departing from the spirit and scope of the present invention. Therefore, it is to be understood that the invention is not to be limited except by the claims which follow.

I claim:

1. An educational book providing interaction between graphic information contained on reference elements with graphic information contained on apertured leaves, said book comprising:
   a base leaf;
   a plurality of reference elements of varying size, each containing graphic information, the reference elements being rotatably mounted on the base leaf in succession, each reference element being smaller than the reference element behind it;
   a plurality of apertured leaves containing a second set of graphic information juxtaposed with respect to the apertures, said leaves in register with and overlying the base leaf with the apertures visually aligned with the reference elements, the reference elements being rotatable with respect to each other and the leaves; and
   binding means binding said apertured leaves and base leaf together at one end.

2. The book of claim 1 wherein the plurality of apertured leaves comprise, for each reference element, a leaf group including at least one leaf, all leaves within the group defining an aperture similar in size and configuration to the reference element to which they correspond.

3. The book of claim 2 wherein said leaf groups are arranged such that progressively larger apertures are exposed as the reader sequentially moves the leaves for successively and cumulatively exposing to view graphic information contained on the reference element.

4. The book of claim 3 wherein the reference elements are disks of varying diameters, rotatably mounted to the base leaf along an axis passing through the disk centers.

5. The book of claim 4 wherein the apertured leaves contain information and instructions directing rotation of the reference element to coincide with further information contained on said apertured leaf.

6. The book of claim 1 wherein the reference elements are all of varying configurations.

7. The book of claim 1 wherein the reference elements are all square-shaped.

8. The book of claim 1 further comprising an apertured front cover and a back cover.

9. The book of claim 1 wherein the binding means is a looseleaf mechanism permitting pages to be substituted, removed from or added to the book.

10. An educational book providing interaction of graphic information contained on reference elements graphic information contained on apertured leaves, said book comprising:
   a base leaf having a front side and back side;
   at least one reference element containing graphic information rotatably attached to the base leaf front side;
   at least one reference element containing graphic information rotatably mounted to the base leaf back side;
   a first plurality of apertured leaves having graphic information areas juxtaposed with respect to the apertures, said leaves in register with and overlying the base leaf front side with the apertures visually aligned with the front side mounted reference element;
   a second plurality of apertured leaves having graphic information areas juxtaposed with respect to the apertures, said leaves in register with and overlying the base leaf back side with the apertures visually aligned with the back side mounted reference elements; and
   binding means binding said apertured leaves and base leaf together at one end.

11. The book of claim 10 comprising:
   a first plurality of reference elements of varying size rotatably mounted to the base leaf front side in succession, each reference element being smaller than the reference element behind it, said reference elements arranged to rotate about a common axis for rotation relative to each other and the first plurality of apertured leaves;
   a second plurality of reference elements of varying size rotatably mounted to the base leaf back side in succession, each reference element being smaller than the reference element behind it, said reference elements arranged to rotate about a common axis, said axis being an extension of the axis of the front side mounted reference elements, for rotation relative to each other and the second plurality of aperture leaves;
   a first plurality of apertured leaves comprising, for each front side mounted reference element, a leaf group including at least one leaf, all leaves within the group defining an aperture similar in size and configuration to the reference element to which they correspond;
   a second plurality of apertured leaves comprising, for each back side mounted reference element, a leaf group including at least one leaf, all leaves within the group defining an aperture similar in size and configuration to the reference element to which they correspond.

12. The apparatus of claim 11 wherein said first plurality of apertured leaves are arranged such that progressively larger apertures are exposed as the reader sequentially moves said leaves and wherein said second plurality of apertured leaves are arranged such that progressively smaller apertures are exposed as the reader sequentially moves said leaves.

13. An educational book providing interaction of graphic information contained on reference elements with graphic information contained on apertured leaves, said book comprising:
   a front cover;
   a back cover;
   a first plurality of reference elements of varying size, each containing graphic information, coaxially rotatably mounted to the inside of the front cover in succession, each reference element being smaller than the reference element behind it;
   a second plurality of reference elements of varying size, each containing graphic information, coaxially rotatably mounted to the inside of the back cover in succession, each reference element being smaller than the reference element behind it and further being in register with the front cover mounted first plurality of reference elements;
   a plurality of apertured leaves having graphic information juxtaposed with respect to the apertures, said leaves in register with and interposing the front and back cover with the apertures in register with the front and back cover reference elements, each reference element of the first and second plurality of reference elements being rotatable with respect to the other reference elements and the apertured leaves; and
   binding means binding said apertured leaves, front cover and back cover together at one end.

14. The apparatus of claim 13 wherein:
   the plurality of leaves includes a first plurality of apertured leaves comprising, for each front cover reference element, a leaf group including at least one leaf, all leaves within the group defining an aperture similar in size and configuration to the front cover reference element to which they correspond and a second plurality of apertured leaves comprising, for each back cover reference element, a leaf group including at least one leaf, all the leaves within the group defining an aperture similar in size and configuration to said back cover reference element to which they correspond.

15. The apparatus of claim 14 wherein the first plurality of apertured leaves are arranged such that progressively larger apertures are exposed as the reader sequentially moves the first plurality of apertured leaves and wherein the second plurality of apertured leaves are arranged such that progressively smaller apertures are exposed as the reader sequentially moves the second plurality of apertured leaves.

* * * * *

UNITED STATES PATENT AND TRADEMARK OFFICE
CERTIFICATE OF CORRECTION

PATENT NO. : 4,537,576

DATED : August 27, 1985

INVENTOR(S) : Howard I. Thorsheim and Bruce B. Roberts

It is certified that error appears in the above-identified patent and that said Letters Patent is hereby corrected as shown below:

In Claim 10, line 16, insert --with-- before "graphic".

Signed and Sealed this

Third Day of December 1985

[SEAL]

*Attest:*

DONALD J. QUIGG

*Attesting Officer*      *Commissioner of Patents and Trademarks*